(12) United States Patent
Noda

(10) Patent No.: US 11,081,701 B2
(45) Date of Patent: Aug. 3, 2021

(54) SECONDARY BATTERY

(71) Applicants: WASEDA UNIVERSITY, Tokyo (JP); ZEON CORPORATION, Tokyo (JP)

(72) Inventor: Suguru Noda, Tokyo (JP)

(73) Assignees: WASEDA UNIVERSITY, Tokyo (JP); ZEON CORPORATION, Tokyo (JP)

( * ) Notice: Subject to any disclaimer, the term of this patent is extended or adjusted under 35 U.S.C. 154(b) by 0 days.

(21) Appl. No.: 16/476,499

(22) PCT Filed: Dec. 22, 2017

(86) PCT No.: PCT/JP2017/046214
§ 371 (c)(1),
(2) Date: Jul. 8, 2019

(87) PCT Pub. No.: WO2018/128099
PCT Pub. Date: Jul. 12, 2018

(65) Prior Publication Data
US 2020/0006780 A1 Jan. 2, 2020

(30) Foreign Application Priority Data
Jan. 6, 2017 (JP) ................................ 2017-001386

(51) Int. Cl.
*H01M 4/80* (2006.01)
*H01M 4/134* (2010.01)
*H01M 4/136* (2010.01)
(Continued)

(52) U.S. Cl.
CPC ............ *H01M 4/808* (2013.01); *H01M 4/134* (2013.01); *H01M 4/136* (2013.01); *H01M 4/663* (2013.01);
(Continued)

(58) Field of Classification Search
None
See application file for complete search history.

(56) References Cited

U.S. PATENT DOCUMENTS

| 2015/0010788 A1* | 1/2015 | Aria | H01M 10/058 |
| | | | 429/50 |
| 2016/0126543 A1* | 5/2016 | Ota | H01M 4/382 |
| | | | 429/231.95 |
| 2016/0268608 A1* | 9/2016 | Nishimura | H01M 4/624 |

FOREIGN PATENT DOCUMENTS

| JP | 2007-42329 A | 2/2007 |
| JP | 2008-243786 A | 10/2008 |
| JP | 2009-527095 A | 7/2009 |

(Continued)

OTHER PUBLICATIONS

Kim, D. Y., et al. "Sub-millimeter-long carbon nanotubes repeatedly grown on a separated from ceramic beads in a single fluidized bed reactor," Department of Chemical System Engineering, Carbon journal (49), Jan. 2011.

(Continued)

*Primary Examiner* — Daniel S Gatewood
(74) *Attorney, Agent, or Firm* — Fox Rothschild LLP; Robert J. Sacco; Carol E. Thorstad-Forsyth

(57) ABSTRACT

A secondary battery includes an electrode structure, the electrode structure includes a positive electrode changing in volume by expansion or contraction during discharging or charging, and a negative electrode changing in volume in a reverse way to the positive. The positive electrode and the negative electrode have a volume ratio of 1.1 or more, the volume ratio being a value obtained by dividing the volume under expansion by the volume under contraction, and the positive electrode or the negative electrode has the volume ratio of 1.9 or more, and has a total volume ratio of 1.2 or less, the total value ratio being a value obtained by dividing (Continued)

a larger value by a smaller value with respect to a total volume of the positive electrode and the negative electrode in a discharged state and a total volume of the positive electrode and the negative electrode in a charged state.

11 Claims, 6 Drawing Sheets

(51) Int. Cl.
　　 $H01M\ 4/66$ 　　　　 (2006.01)
　　 $H01M\ 10/0525$ 　 (2010.01)
　　 $H01M\ 10/058$ 　　 (2010.01)
　　 $H01M\ 4/38$ 　　　　 (2006.01)
　　 $H01M\ 4/58$ 　　　　 (2010.01)

(52) U.S. Cl.
　　 CPC ..... $H01M\ 10/058$ (2013.01); $H01M\ 10/0525$ (2013.01); $H01M\ 4/386$ (2013.01); $H01M\ 4/5815$ (2013.01)

(56) References Cited

FOREIGN PATENT DOCUMENTS

| JP | 5447367 | A1 |   | 7/2011 |
|----|---------|----|---|--------|
| JP | 5862559 | A1 |   | 6/2013 |
| JP | 2015-506899 | A |   | 3/2015 |
| JP | 2015-138777 | A |   | 7/2015 |
| JP | 2015-167065 | A |   | 9/2015 |
| JP | 2016048698 | A |   | 4/2016 |
| JP | 2016-131123 | A |   | 7/2016 |
| JP | 2016-173985 | A |   | 9/2016 |
| JP | 2016-184484 | A |   | 10/2016 |
| JP | 2016184484 | A | * | 10/2016 |
| WO | 2016-129528 | A1 |   | 8/2016 |

OTHER PUBLICATIONS

Chen, Z, et al. "Over 99.6 wt%-pure, sub-millimeter-long carbon nanotubes realized by fluidized-bed with careful control of the catalyst and carbon feeds," Department of Chemical System Engineering, Carbon journal (49), Aug. 2014.

* cited by examiner

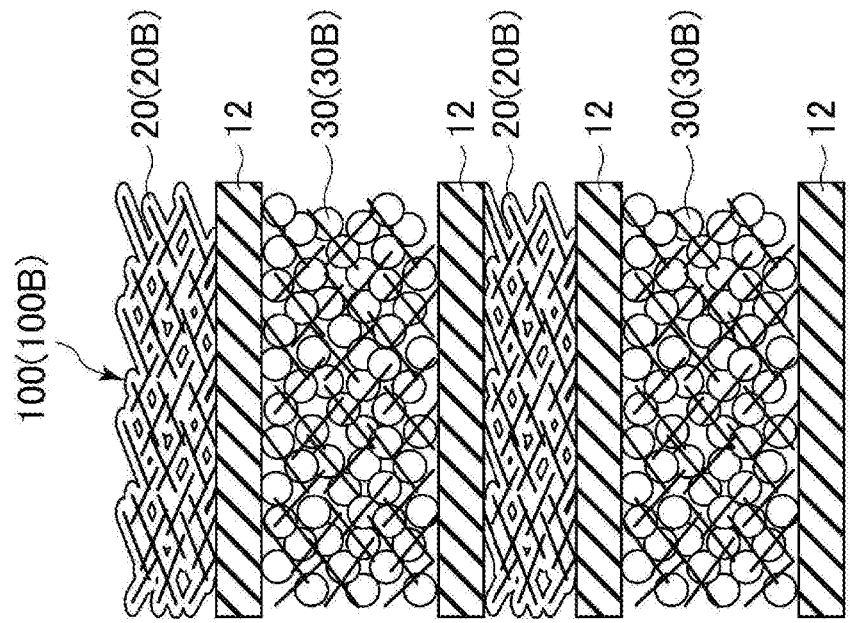
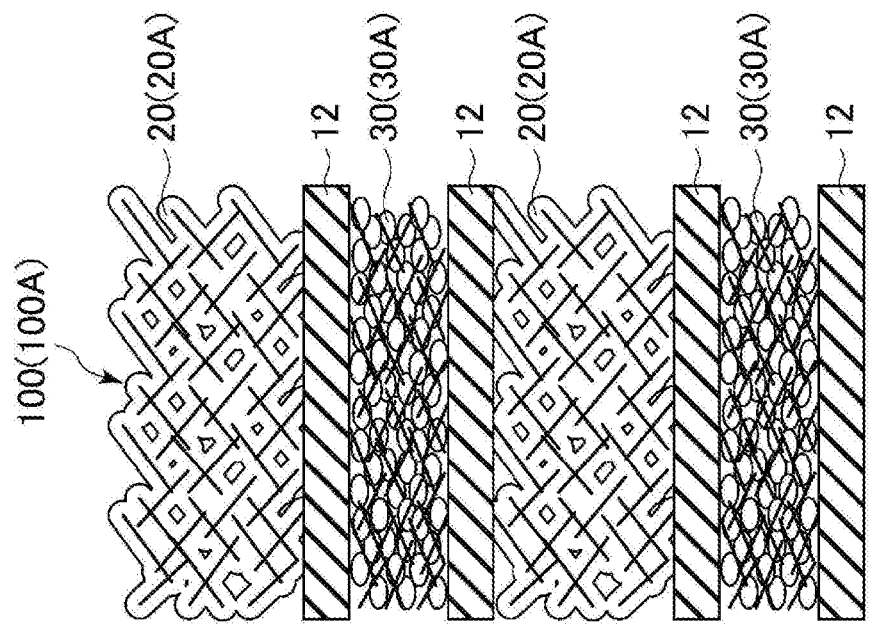

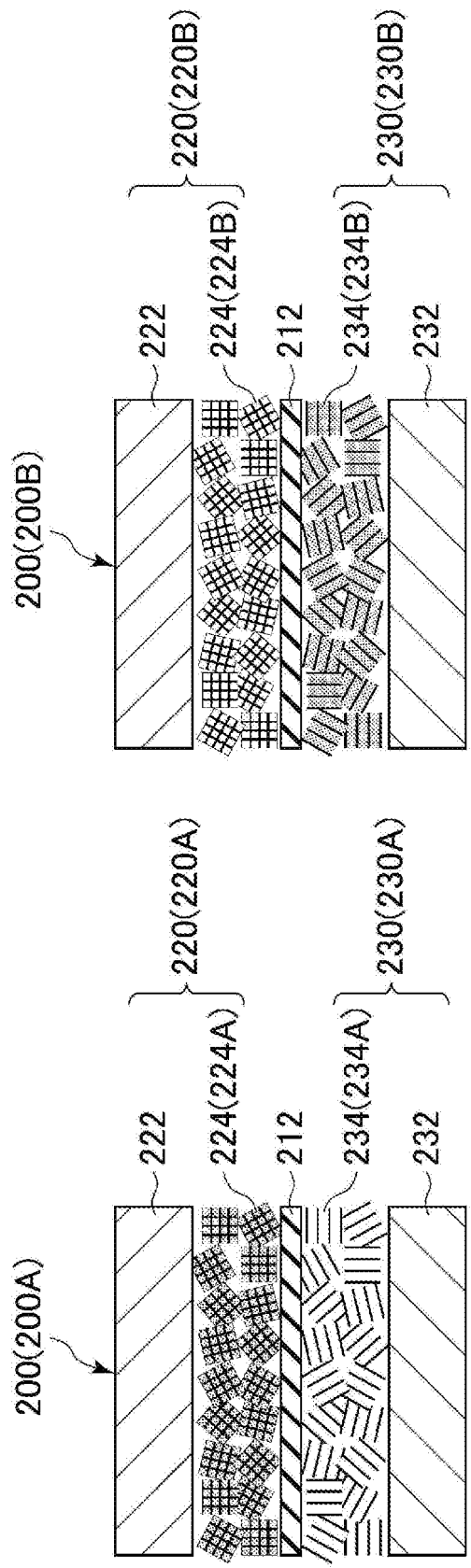

SECONDARY BATTERY

CROSS REFERENCE TO RELATED APPLICATIONS

This application is a U.S. National Stage entry under 35 U.S.C. § 371 based on International Application No. PCT/JP2017/046214, filed on Dec. 22, 2017, which claims priority to Japanese Patent Application No. 2017-001386, filed on Jan. 6, 2017, both of which are hereby incorporated herein by reference in their entireties.

TECHNICAL FIELD

The present invention relates to a secondary battery.

BACKGROUND ART

In recent years, development of secondary batteries having high energy density has been actively carried out, but in order to support an energy system on a full scale, further increase in capacity and reduction in cost are required. With respect to lithium ion secondary batteries, change in volume is made small in both positive and negative electrodes and stable charging and discharging are realized by using lithium transition metal complex oxides such as lithium cobalt oxide ($LiCoO_2$) as a positive electrode active material, using carbon materials such as graphite (C) as a negative electrode active material, and intercalating and deintercalating lithium ions ($Li^+$) into and from gaps of the crystal structures of the active materials. However, the lithium transition metal complex oxides and the carbon materials have large masses and volumes for lithium ions that can be retained by them, and it is difficult to further increase in capacity density.

Therefore, studies on high-capacity batteries using active materials such as sulfur, silicon or tin, that react with lithium to form compounds, have been advanced. When an active material such as sulfur or silicon is used, a high capacity density can be realized because the amount of lithium ions to react with the active material is large, whereas change in volume during charging and discharging is large. The volume change causes deterioration of the structure of a battery or an electrode. In order to suppress the volume change, a composite technology of covering the active material with a shell material or the like has been studied, but an additional material causes the electrode to increase in mass and volume. Moreover, there has been studied a technique for suppressing the volume change of the electrode by beforehand providing, inside the electrode, a pore in which the active material can expand, but the capacity density per electrode volume decreases. It is difficult to increase the capacity density of batteries while suppressing the volume change of the electrodes.

With respect to lithium ion secondary batteries, there has been proposed a positive electrode using carbon nanotubes (hereinafter, referred to as CNTs) as a conductive material in order to prevent agglomeration of the conductive material used for the positive electrode to ensure conduction of a positive electrode active material, increase the capacity density, and suppress decrease in capacity density under high output (for example, Patent Literature 1).

However, it has been still impossible to acquire a secondary battery that can suppress deterioration of the entire battery caused by volume change of each of positive and negative electrodes during charging and discharging and also has a high capacity density.

CITATION LIST

Patent Literature

Patent Literature 1: Japanese Patent Laid-Open No. 2016-48698

SUMMARY OF INVENTION

Technical Problem

The present invention has an object to provide a secondary battery that can maintain the stability of an entire battery during charging and discharging and has a high capacity density.

Solution to Problem

A secondary battery according to the present invention includes an electrode structure, the electrode structure includes a positive electrode changing in volume by expansion or contraction during discharging or charging and a negative electrode changing in volume in a reverse way to the positive electrode, the positive electrode and the negative electrode are disposed with a separator therebetween, wherein the positive electrode and the negative electrode have a volume ratio of 1.1 or more, the volume ratio being a value obtained by dividing a volume under expansion by a volume under contraction, the positive electrode or the negative electrode has the volume ratio of 1.9 or more, and a total volume ratio is 1.2 or less, the total volume ratio being a value obtained by dividing a larger value by a smaller value with respect to a total volume of the positive electrode and the negative electrode in a discharged state and a total volume of the positive electrode and the negative electrode in a charged state.

Advantageous Effects of Invention

According to the present invention, the positive electrode and the negative electrode in the electrode structure improve the capacity density of the secondary battery by using active materials having a high capacity density while having a large volume change during charging and discharging. One of the positive electrode and the negative electrode has a large volume ratio of a volume in a charged(discharged) state to a volume in a discharged(charged) state which is 1.9 or more. However, the total volume ratio is 1.2 or less, the total volume ratio being a value obtained by dividing a larger value by a smaller value with respect to the total volume of the positive electrode and the negative electrode in the discharged state and the total volume of the positive electrode and the negative electrode in the charged state. Since the volume change in the charged state and the discharged state is restricted as the entire electrode structure, deterioration of the structure is suppressed and stability can be maintained.

The volumes of the positive electrode and the negative electrode change during charging and discharging, but by using the electrode structure in which the volume change as a whole is suppressed, a secondary battery having both of the overall stability during charging and discharging and a high capacity density can be provided.

BRIEF DESCRIPTION OF DRAWINGS

FIG. 1 is a cross-sectional view showing a configuration of an electrode structure included in a secondary battery according to an embodiment, wherein

FIG. 2 is a schematic diagram showing a configuration of a positive electrode or a negative electrode included in the electrode structure shown in FIG. 1, wherein

FIG. 4 is a cross-sectional view showing a configuration of an electrode structure included in a secondary battery of a modification, wherein FIG. 4A is a cross-sectional view in a discharged state and FIG. 4B is a cross-sectional view in a charged state;

FIG. 5 is a cross-sectional view showing a configuration of an electrode structure included in a conventional secondary battery, wherein FIG. 5A is a cross-sectional view in a discharged state and FIG. 5B is a cross-sectional view in a charged state.

DESCRIPTION OF EMBODIMENTS

An embodiment will be described hereinafter in detail with reference to the drawings.

1. Entire Configuration

A secondary battery according to the present embodiment includes an electrode structure in which a positive electrode and a negative electrode are disposed with a separator therebetween. The electrode structure will be described with reference to FIGS. 1A and 1B.

In the electrode structure 10, a positive electrode 20 is provided on one surface of the separator 12, and a negative electrode 30 is provided on the other surface of the separator 12. The positive electrode 20 expands during discharging (FIGS. 1A and 20A) and contracts during charging (FIGS. 1B and 20B). On the other hand, the negative electrode 30 contracts during discharging (FIGS. 1A and 30A) and expands during charging (FIGS. 1B and 30B).

Figure 1A:
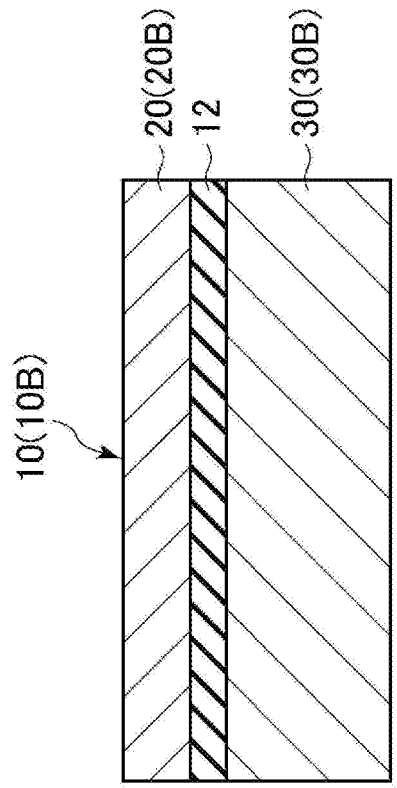
FIG. 1A is a cross-sectional view in a discharged state and FIG. 1B is a cross-sectional view in a charged state.
Figure 1B:
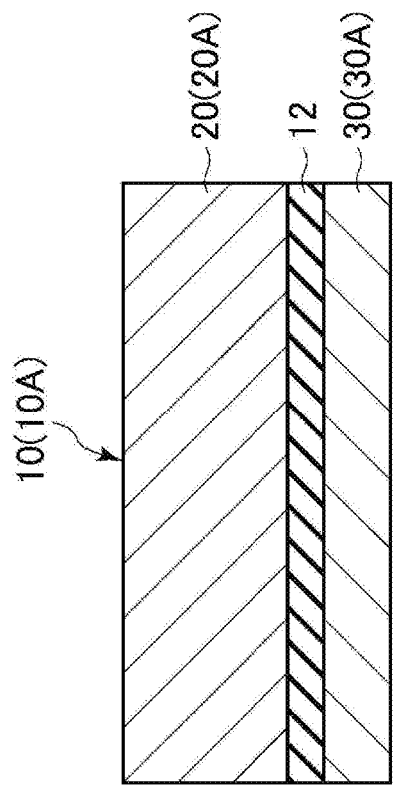

As shown in FIG. 1A, the electrode structure 10A in a discharged state includes an expanded positive electrode 20A and a contracted negative electrode 30A which are set separated by the separator 12. As shown in FIG. 1B, the electrode structure 10B in a charged state includes a contracted positive electrode 20B and an expanded negative electrode 30B which are set separated by the separator 12.

The positive electrode 20 and the negative electrode 30 have a volume ratio of 1.1 or more, for example, 1.1, which is a value obtained by dividing the volume under expansion by the volume under contraction. The positive electrode 20 and the negative electrode 30 have preferably a volume ratio of 1.2 or more, more preferably 1.4 or more, which is a value obtained by dividing the volume under expansion by the volume under contraction. Any one of the positive electrode 20 and the negative electrode 30 has a volume ratio of 1.9 or more, for example, 1.9, which is a value obtained by dividing the volume under expansion by the volume under contraction. Any one of the positive electrode 20 and the negative electrode 30 has preferably a volume ratio of 2.2 or more, more preferably 2.8 or more, which is a value obtained by dividing the volume under expansion by the volume under contraction.

During charging and discharging, the areas of surfaces of the positive electrode 20 and the negative electrode 30 which are in contact with the separator 12 do not substantially change, and the positive electrode 20 and the negative electrode 30 expand or contract due to changes of the film thicknesses thereof. Therefore, the volume ratio can be calculated from the film thickness. The volume ratio of the positive electrode 20 is obtained by dividing the film thickness in a discharged state (20A) by the film thickness in a charged state (20B). The volume ratio of the negative electrode 30 is obtained by dividing the film thickness in a charged state (30B) by the film thickness in a discharged state (30A).

With respect to the total volume of the positive electrode 20 and the negative electrode 30, a total volume ratio which is a value obtained by dividing a larger value by a smaller value in a discharged state (FIG. 1A) or a charged state (FIG. 1B) (hereinafter also referred to a ratio of total volumes in charged and discharged states) is 1.2 or less, for example 1.2. The ratio of the total volumes in charged and discharged states is preferably 1.1 or less, more preferably 1.05 or less.

The ratio of the total volumes in charged and discharged states of the positive electrode 20 and the negative electrode 30 can be determined by using the total film thickness of the film thickness of the positive electrode 20 and the film thickness of the negative electrode 30. With respect to the total film thickness of the positive electrode 20A and the negative electrode 30A in a discharged state (hereinafter referred to as a positive and negative electrode total film thickness in a discharged state), and the total film thickness of the positive electrode 20B and the negative electrode 30B in a charged state (hereinafter referred to as positive and negative electrode total film thickness in a charged state), larger is divided by a smaller value to obtain a ratio of total volumes in charged and discharged states.

Figure 2A:
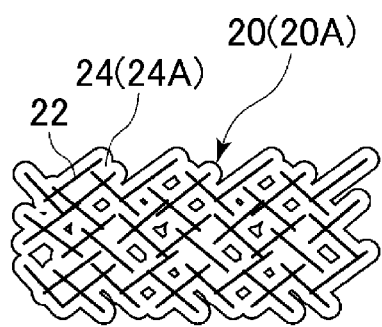
FIG. 2A is a schematic diagram showing the configuration of the positive electrode in a discharged state.
Figure 2B:
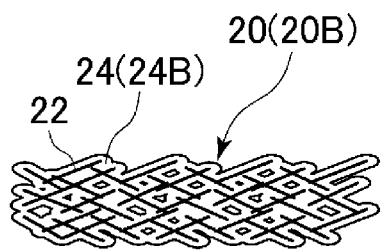
FIG. 2B is a schematic diagram showing the configuration of the positive electrode in a charged state.

As shown in FIGS. 2A and 2B, the positive electrode 20 (20A, 20B) includes a first three-dimensional current collector 22 formed of a sponge-like structure of CNTs and a positive electrode active material 24 (24A, 24B) contained inside the first three-dimensional current collector 22. The positive electrode active material 24A contained in the positive electrode 20A (FIG. 2A) in a discharged state is, for example, $Li_2S$, and the positive electrode active material 24B contained in the positive electrode 20B (FIG. 2B) in a charged state is, for example, S.

Note that the positive electrode active material may be in an intermediate state like $Li_2S_2$ or the like, and the positive electrode may be configured by other materials. The positive electrode active materials 24A and 24B may have such a structure as covers the three-dimensional current collector 22. The positive electrode active materials 24A and 24B may have a particulate structure or may have other structures. The positive electrode active material 24A and the positive electrode active material 24B may have different structures.

Figure 2C:
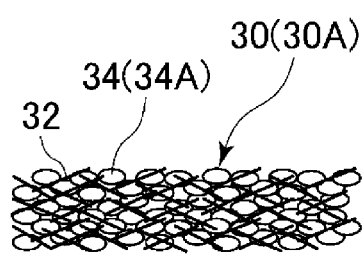
FIG. 2C is a schematic diagram showing the configuration of the negative electrode in a discharged state.
Figure 2D:
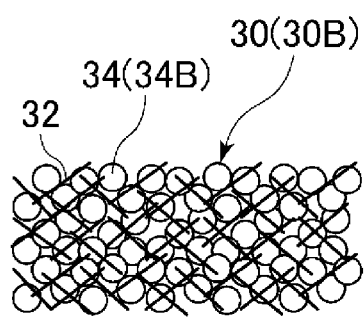
FIG. 2D is a schematic diagram showing the configuration of the negative electrode in a charged state.

As shown in FIGS. 2C and 2D, the negative electrode 30 (30A, 30B) includes a second three-dimensional current collector 32 formed of a sponge-like structure of CNTs and a negative electrode active material 34 (34A, 34B) contained inside the second three-dimensional current collector 32. The negative electrode active material 34A contained in the negative electrode 30A (FIG. 2C) in a discharged state is, for example, Si, and the negative electrode active material 34B contained in the negative electrode 30B (FIG. 2D) in a charged state is, for example, $Li_{15}Si_4$.

Note that the negative electrode active material may be in a state where the compositions of Li and Si are different like $Li_{22}Si_5$, and the negative electrode may be made of another material such as Sn. The negative electrode active materials 34A and 34B may have a structure covering the three-dimensional current collector 32, may have a particulate structure or may have another structure. The negative electrode active material 34A and the negative electrode active material 34B may have different structures.

The negative electrode 30 preferably has a porosity which is the same level as the positive electrode 20, but may not necessarily have the same porosity. Even when pores are filled with electrolytic solution, the volume ratio containing the electrolytic solution is referred to as the porosity. If the difference between the porosity of the negative electrode 30 and the porosity of the positive electrode 20 is within about ±30%, there is no particular problem.

With respect to the positive electrode 20 and the negative electrode 30, the volumetric energy density can be increased as the porosity decreases, but when the porosity is too small, the electrolytic solution is less likely to infiltrate into the electrodes, or the volume change during charging and discharging increases. The porosities of the positive electrode 20 and the negative electrode 30 are preferably 5% or more, and more preferably 10% or more. On the other hand, when the porosity is too large, the volumetric energy density decreases. The porosities of the positive electrode 20 and the negative electrode 30 are preferably less than 80%, more preferably less than 70%, and most preferably 60% or less. The porosity is the volume ratio of pores. The magnitude of the porosity in the positive electrode 20 and the negative electrode 30 can be adjusted, for example, by changing the porosity of the three-dimensional current collector or changing the amount of the active material.

It is preferable that the positive electrode 20 and the negative electrode 30 contain no metal foil. If the positive electrode and the negative electrode contain metal foil in contact with the positive electrode and the negative electrode on the entire surfaces thereof, the electrodes become heavy, the metal foil inhibits the volume change of the positive electrode and the negative electrode, and stress occurs between the metal foil and the positive electrode and between the metal foil and the negative electrode, which causes deterioration. In this case, the positive electrode 20 includes a first three-dimensional current collector 22 formed of a sponge-like structure of CNTs, and a positive electrode active material 24 (24A, 24B) contained inside the first three-dimensional current collector 22. The negative electrode 30 includes a second three-dimensional current collector 32 formed of a sponge-like structure of CNTs, and a negative electrode active material 34 (34A, 34B) contained inside the second three-dimensional current collector 32.

Figure 3:
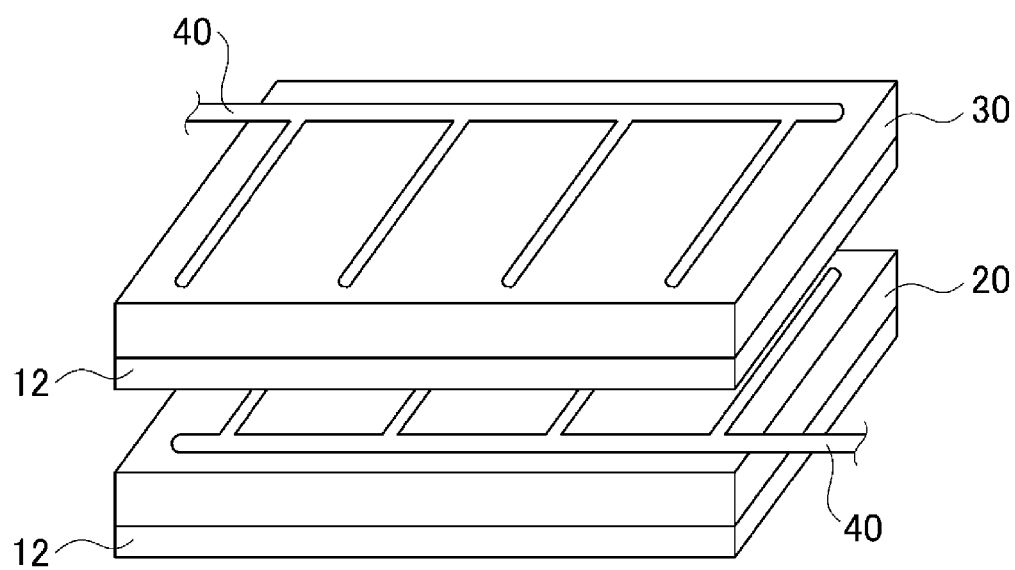
FIG. 3 is a schematic diagram of the electrode structure in which metal wires are provided to the positive electrode and the negative electrode.

Note that the positive electrode 20 and the negative electrode 30 may include metal wires 40 which are partially in contact with the positive electrode 20 and the negative electrode 30 as shown in FIG. 3. The metal wire 40 can be changed to a metal grid or the like. The metal wire 40 and the metal grid are lighter than the metal foil, and in the structure that the metal wires 40 or the metal grids are in partial contact with the positive electrode 20 and the negative electrode 30, the volume change of the positive electrode 20 and the negative electrode 30 is not inhibited and also occurrence of stress is suppressed. FIG. 3 shows a case where each of the metal wire 40 of the positive electrode 20 and the metal wire 40 of the negative electrode 30 is configured to be comb-shaped, and a comb-shaped portion of the metal wire 40 of the positive electrode 20 and a comb-shaped portion of the metal wire 40 of the negative electrode 30 overlap each other in plan view. The present invention is not limited to this form, and it may have a form in which in a plan view, the comb-shaped portion of the metal wire 40 of the positive electrode 20 may be arranged between two comb-shaped portions of the metal wire of the negative electrode 30. The shapes of the metal wire 40 of the positive electrode 20 and the metal wire 40 of the negative electrode 30 may be set to various other shapes. With respect to a manner in which the positive electrode 20 and the negative electrode 30 are in contact with the metal wires 40, the metal wires 40 may also be in contact with the surfaces of the positive electrode 20 and the negative electrode 30 or in contact with the insides of the positive electrode 20 and the negative electrode 30 as shown in FIG. 3.

The positive electrode 20 and the negative electrode 30 contain no metal foil, so that the volume changes of the positive electrode 20 and the negative electrode 30 during charging and discharging are not restricted, and the volumes thereof reversibly change by the sponge-like structure of flexible CNTs. In addition, an increase in mass caused by the metal foil is avoided, which leads to reduction in weight of the secondary battery.

The electrode structure as described above is accommodated together with the electrolytic solution in a case, thereby configuring the secondary battery of the present embodiment. The secondary battery of the present embodiment is a lithium secondary battery in which Li is contained in the positive electrode in a discharged state and the negative electrode in a charged state. In order to obtain high battery capacity density, the mass ratio of Li is preferably 5% or more of the entire secondary battery. The mass ratio of Li is more preferably 7% or more of the entire secondary battery, and most preferably 9% or more. It is desirable that the mass ratio of Li is at most about 18% of the entire secondary battery.

In the secondary battery of the present embodiment, in order to obtain high battery capacity density, the mass ratio of S is preferably 12% or more of the entire secondary battery. The mass ratio of S is more preferably 16% or more of the entire secondary battery, and most preferably 20% or more. It is desirable that the mass ratio of S is at most about 40% of the entire secondary battery.

In the secondary battery of the present embodiment, in order to obtain high battery capacity density, the mass ratio of Si is preferably 6% or more of the entire secondary battery. The mass ratio of Si is more preferably 8% or more of the entire secondary battery, and most preferably 10% or more. It is desirable that the mass ratio of Si is at most about 20% of the entire secondary battery.

2. Manufacturing Method

In order to manufacture the secondary battery according to the present embodiment, the positive electrode and the negative electrode are first laminated on one surface and the other surface of the separator respectively to obtain an electrode structure. The separator may be formed of a microporous polypropylene film. As the separator may be used a microporous film or non-woven fabric of polyolefin type, polyester type, polyacrylonitrile type, polyphenylene sulfide type, polyimide type or fluorocarbon resin type.

The positive electrode can be formed by co-dispersing and filtering CNTs serving as a raw material for a sponge-like structure and $Li_2S$ serving as a positive electrode active material. Specifically, a self-supporting film is formed by filtration using a dispersion liquid in which CNTs and nanoparticulate $Li_2S$ are dispersed in a dispersion medium such as ethanol or isopropanol. The ratio of CNTs and $Li_2S$ is preferably set to about 1:1 to 1:100 by mass. The porosity of the positive electrode can be adjusted by changing the ratio of CNTs and $Li_2S$ or the dispersion state of CNTs and $Li_2S$. Furthermore, the porosity of the positive electrode may be adjusted by performing a treatment such as pressing after film formation.

CNTs to be used are preferably elongated (about 1 to 15 nm in diameter, about 10 to 1000 μm in average length). Such CNTs can be synthesized by a CVD method. There is a fluidized-bed CVD method described in Japanese Patent No. 5447367, Japanese Patent No. 5862559, D. Y. Kim, H. Sugime, K. Hasegawa, T. Osawa, and S. Noda, Carbon 49 (6), 1972-1979 (2011)., Z. Chen, D. Y. Kim, K. Hasegawa, T. Osawa, and S. Noda, Carbon 80, 339-350 (2014), etc., for example. CNTs may also be synthesized by a floating catalyst CVD method or an on-substrate catalyst CVD method. Nanoparticulate $Li_2S$ can be obtained by a general method such as a method of pulverizing $Li_2S$ powder by a ball mill method.

CNTs form a network by van der Waals force while incorporating nanoparticulate $Li_2S$. In this way, $Li_2S$ as the positive electrode active material is incorporated into gaps in the first three-dimensional current collector made of a sponge-like structure of CNTs to thereby form the positive electrode.

The negative electrode can be formed by co-dispersing and filtering CNTs serving as a raw material for the sponge-like structure and Si serving as a negative electrode active material. Specifically, a self-supporting film is formed by filtration using a dispersion liquid in which CNTs and nanoparticulate Si are dispersed in a dispersion medium such as ethanol or isopropanol. The ratio of CNTs and Si is preferably set to about 1:1 to 1:100 by mass. CNTs are preferably long as described above.

Nanoparticulate Si can be obtained by various methods. For example, a method of boiling Si in an inert gas by an in-gas evaporation method, a method of thermally decomposing a silane-based gas by the CVD method, a method of grinding a lump of silicon by a ball mill method, etc. may be recited. The porosity of the negative electrode can also be adjusted by changing the ratio of CNTs and Si or the dispersion state of CNTs and Si, or by performing a treatment such as pressing after film formation.

CNTs form a network by van der Waals force while incorporating nanoparticulate Si. Thus, Si as the negative electrode active material is incorporated into the gaps in the second three-dimensional current collector made of the sponge-like structure of CNTs to thereby form the negative electrode.

The positive electrode and the negative electrode obtained by the above steps are laminated on one surface and the other surface of the separator to produce an electrode structure. In the manufactured electrode structure, the ratio of the total volumes of the positive electrode and the negative electrode in charged and discharged states is 1.2 or less. The ratio of the total volumes in charged and discharged states can be controlled by adjusting the thicknesses and/or the porosities of the positive electrode and the negative electrode. As described above, the porosity can be adjusted by changing the porosity of the three-dimensional current collector or the amount of the active material. A metal wire for power transmission is arranged on the surface of the electrode structure, and then the electrode structure is accommodated in a case together with an electrolytic solution.

The electrolytic solution is not particularly limited, and a generally used electrolytic solution such as a non-aqueous electrolytic solution, an ionic liquid, and a gel electrolytic solution can be used. For example, the non-aqueous electrolytic solution can be prepared by dissolving 1.0 mol/L of $LiPF_6$ in a mixture solution of ethylene carbonate (EC) and dimethyl carbonate (DMC). The volume ratio of EC and DMC is generally about 1:2.

The case is not particularly limited, and a metal can of iron, stainless steel, aluminum or the like which is generally used in a battery can be used. From the viewpoint of energy density per weight, a metal resin composite member in which metal foil and a resin film are laminated is preferable.

As the metal wire, for example, fine metal wires of 10 to 100 μm in diameter may be placed on the surfaces of the positive electrode and the negative electrode at intervals of 0.1 to 10 mm. The metal wire for the positive electrode is preferably made of metal such as aluminum or stainless steel. The metal wire for the negative electrode is preferably made of metal such as copper, nickel or stainless steel. By using the metal wire, the amount of the metal can be significantly reduced, and it is possible to ensure sufficient conductivity with the metal whose mass is $\frac{1}{10}$ to $\frac{1}{100}$ of the mass in the prior art.

The secondary battery according to the present embodiment having a predetermined electrode structure is manufactured by passing through predetermined steps as necessary.

3. Action and Effect

The secondary battery according to the present embodiment includes the electrode structure in which the volume change as a whole is suppressed while the volumes of the positive electrode and the negative electrode change by a predetermined rate or more during charging and discharging.

Since the ratio of the total volumes in charged and discharged states is 1.2 or less, the volume change as the whole electrode structure is suppressed. As a result, the deterioration of the structure is suppressed, the stability can be maintained during charging and discharging, and the cycle life is also improved.

The positive electrode and the negative electrode included in the electrode structure change in volume during charging and discharging, and the volume under expansion is at least 1.1 times as large as the volume under contraction. Moreover, in one of the positive electrode and the negative electrode, the volume under expansion is at least 1.9 times as large as the volume under contraction. As the volume ratio which is a value obtained by dividing the volume under expansion by the volume under contraction is larger, the capacity density is larger, so that it is preferable that the volume ratio is larger. Since the positive electrode and the negative electrode using the active material having a high capacity density are provided while the volume change during charging and discharging is large, the secondary battery according to the present embodiment can achieve a high capacity density.

4. Modification

The present invention is not limited to the above embodiment, and can be appropriately modified within the subject matter of the present invention. For example, the positive electrode 20 containing S is used in the above embodiment, but it is possible to use positive electrodes containing oxides of various transition metals, fluoride phosphates of various transition metals, silicates of various transition metals, polymer compounds having redox activity, organic compounds or the like instead of S. Furthermore, the negative electrode 30 containing Si is used in the above embodiment, but it is possible to use Sn, metal hydrides, metal sulfides, various carbon materials such as hard carbon or graphene oxide, polymer compounds having redox activity, organic compounds or the like instead of Si. In some cases, it is also possible to combine and use two or more raw materials for the positive electrode 20 or the negative electrode 30.

The first three-dimensional current collector in the positive electrode 20 and the second three-dimensional current collector in the negative electrode 30 are sponge-like structures of CNTs, but they may be sponge-like structures of other nanocarbon materials such as graphene.

In the above embodiment, the secondary battery having the electrode structure including a pair of a positive electrode and a negative electrode has been described, but the configuration of the secondary battery is not limited to the above embodiment. As shown to FIGS. 4A and 4B, a secondary battery may have an electrode structure 100 including plural positive electrodes 20 and negative electrodes 30 which are disposed with separators 12 therebetween. As shown in FIG. 4A, the electrode structure 100A in a discharged state includes the expanded positive electrodes 20A and the contracted negative electrodes 30A. As shown in FIG. 4B, the electrode structure 100B in a charged state includes the contracted positive electrodes 20B and the expanded negative electrodes 30B.

In the case of such an electrode structure 100, the positive electrode 20 has a volume ratio of 1.1 or more, which is a value obtained by dividing the total of the volumes under expansion (20A) by the total of the volumes under contraction (20B). Likewise, the negative electrode 30 has a volume ratio of 1.1 or more, which is a value obtained by dividing the total of the volumes under expansion (30B) by the total of the volumes under contraction (30A). One of the positive electrode 20 and the negative electrode 30 has a volume ratio of 1.9 or more, which is a value obtained by dividing the total of the volumes under expansion by the total of the volumes under contraction is 1.9 or more.

Furthermore, with respect to the total volume in the discharged state (FIG. 4A) and the total volume in the charged state (FIG. 4B) in the positive electrodes 20 and the negative electrodes 30, the total volume ratio which is a value obtained by dividing a larger value by a smaller value is 1.2 or less. The ratio of the total volume of the positive electrodes 20 and the negative electrodes 30 in a discharged state and the total volume of the positive electrodes 20 and the negative electrodes 30 in a charged state can be calculated by dividing a larger value by a smaller value with respect to the total film thickness of the positive electrodes 20A and the negative electrodes 30A in electrode structure 100A in the discharged state (a positive and negative electrode total film thickness in the discharged state) and the total film thickness of the positive electrodes 20B and the negative electrodes 30B in the electrode structure 100B in the charged state (a positive and negative electrode total film thickness in the charged state).

5. Examples

The following Table 1 summarizes the configurations of the positive electrode and the negative electrode in the secondary batteries of Examples and Comparative Examples. The numerical values in the table are determined according to a predetermined calculation formula by setting conditions as described later.

TABLE 1

|  |  | EXAMPLES | | | | | |
| --- | --- | --- | --- | --- | --- | --- | --- |
|  |  | 1 | 2 | 3 | 4 | 5 | 6 |
| POSITIVE ELECTRODE ACTIVE MATERIAL | DISCHARGED STATE | $Li_2S$ | $Li_2S$ | $Li_2S$ | $Li_2S$ | $Li_2S$ | $Li_2S$ |
|  | CHAEGED STATE | S | S | S | S | S | S |
| NEGATIVE ELECTRODE ACTIVE MATERIAL | DISCHARGED STATE | Si | Si | Si | Si | Si | Si |
|  | CHAEGED STATE | $Li_{15}Si_4$ | $Li_{15}Si_4$ | $Li_{15}Si_4$ | $Li_{15}Si_4$ | $Li_{15}Si_4$ | $Li_{15}Si_4$ |
| CURRENT COLLECTOR | POSITIVE ELECTRODE |  |  | CNT SPONGE | | | |
|  | NEGATIVE ELECTRODE |  |  | CNT SPONGE | | | |
| POSITIVE AND NEGATIVE ELECTRODE POROSITY (%) |  | 10 | 20 | 30 | 40 | 50 | 60 |
| (a) MASS (g/m$^2$) OF POSITIVE ELECTRODE ACTIVE MATERIAL IN DISCHARGED STATE |  | 34.3 | 34.3 | 34.3 | 34.3 | 34.3 | 34.3 |
| (b) MASS(g/m$^2$) OF POSITIVE ELECTRODE IN DISCHARGED STATE |  | 38.1 | 38.1 | 38.1 | 38.1 | 38.1 | 38.1 |
| (c) FILM THICKNESS (μm) OF POSITIVE ELECTRODE IN DISCHARGED STATE |  | 25.1 | 28.2 | 32.2 | 37.6 | 45.1 | 56.4 |
| (d) MASS (g/m$^2$) OF NEGATIVE ELECTRODE ACTIVE MATERIAL IN DISCHARGED STATE |  | 11.2 | 11.2 | 11.2 | 11.2 | 11.2 | 11.2 |
| (e) MASS (g/m$^2$) OF NEGATIVE ELECTRODE IN DISCHARGED STATE |  | 12.4 | 12.4 | 12.4 | 12.4 | 12.4 | 12.4 |
| (f) FILM THICKNESS (μm) OF NEGATIVE ELECTRODE IN DISCHARGED STATE |  | 6.0 | 6.8 | 7.7 | 9.0 | 10.8 | 13.5 |
| (c + f) TOTAL FILM THICKNESS (μm) OF POSITIVE AND NEGATIVE ELECTRODES IN DISCHARGED STATE |  | 31.1 | 35.0 | 39.9 | 46.6 | 55.9 | 69.9 |
| (a') MASS (g/m$^2$) OF POSITIVE ELECTRODE ACTIVE MATERIAL IN CHARGED STATE |  | 23.9 | 23.9 | 23.9 | 23.9 | 23.9 | 23.9 |
| (b') MASS (g/m$^2$) OF POSITIVE ELECTRODE IN CHARGED STATE |  | 27.7 | 27.7 | 27.7 | 27.7 | 27.7 | 27.7 |
| (c') FILM THICKNESS (μm) OF POSITIVE ELECTRODE IN CHARGED STATE |  | 16.0 | 19.1 | 23.1 | 28.5 | 36.0 | 47.3 |
| (d') MASS (g/m$^2$) OF NEGATIVE ELECTRODE ACTIVE MATERIAL IN CHARGED STATE |  | 21.5 | 21.5 | 21.5 | 21.5 | 21.5 | 21.5 |
| (e') MASS (g/m$^2$) OF NEGATIVE ELECTRODE IN CHARGED STATE |  | 22.8 | 22.8 | 22.8 | 22.8 | 22.8 | 22.8 |

TABLE 1-continued

|   |   |   |   |   |   |   |   |
|---|---|---|---|---|---|---|---|
| (f') FILM THICKNESS (μm) OF NEGATIVE ELECTRODE IN CHARGED STATE | | 19.0 | 19.8 | 20.7 | 22.0 | 23.8 | 26.5 |
| (c' + f') TOTAL FILM THICKNESS (μm) OF POSITIVE AND NEGATIVE ELECTRODES IN CHARGED STATE | | 35.0 | 38.9 | 43.8 | 50.5 | 59.8 | 73.8 |
| VOLUME RATIO IN CHARGED AND DISCHARGED STATE | POSITIVE ELECTRODE (c/c') | 1.57 | 1.48 | 1.39 | 1.32 | 1.25 | 1.19 |
| | NEGATIVE ELECTRODE (f/f') | 3.17 | 2.91 | 2.69 | 2.44 | 2.20 | 1.96 |
| | TOTAL OF POSITIVE AND NEGATIVE ELECTRODES | 1.13 | 1.11 | 1.10 | 1.08 | 1.07 | 1.06 |

| | | COMPARATIVE EXAMPLES | | | | |
|---|---|---|---|---|---|---|
| | | 1 | 2 | 3 | 4 | 5 |
| POSITIVE ELECTRODE ACTIVE MATERIAL | DISCHARGED STATE | $LiCoO_2$ | $LiCoO_2$ | $Li_2S$ | $Li_2S$ | $Li_2S$ |
| | CHARGED STATE | $Li_{0.5}CoO_2$ | $Li_{0.5}CoO_2$ | S | S | S |
| NEGATIVE ELECTRODE ACTIVE MATERIAL | DISCHARGED STATE | C | Si | C | Si | Si |
| | CHARGED STATE | $LiC_6$ | $Li_{15}Si_4$ | $LiC_6$ | $Li_{15}Si_4$ | $Li_{15}Si_4$ |
| CURRENT COLLECTOR | POSITIVE ELECTRODE | Al FOIL | Al FOIL | CNT SPONGE | CNT SPONGE | Al FOIL |
| | NEGATIVE ELECTRODE | Cu FOIL | CNT SPONGE | Cu FOIL | CNT SPONGE | Cu FOIL |
| POSITIVE AND NEGATIVE ELECTRODE POROSITY (%) | | 20 | 20 | 20 | 80 | 20 |
| (a) MASS (g/m$^2$) OF POSITIVE ELECTRODE ACTIVE MATERIAL IN DISCHARGED STATE | | 292.1 | 292.1 | 34.3 | 34.3 | 34.3 |
| (b) MASS(g/m$^2$) OF POSITIVE ELECTRODE IN DISCHARGED STATE | | 344.8 | 344.8 | 38.1 | 38.1 | 58.3 |
| (c) FILM THICKNESS (μm) OF POSITIVE ELECTRODE IN DISCHARGED STATE | | 112.3 | 112.3 | 28.2 | 112.8 | 37.6 |
| (d) MASS (g/m$^2$) OF NEGATIVE ELECTRODE ACTIVE MATERIAL IN DISCHARGED STATE | | 107.5 | 11.2 | 107.5 | 11.2 | 11.2 |
| (e) MASS (g/m$^2$) OF NEGATIVE ELECTRODE IN DISCHARGED STATE | | 186.5 | 12.4 | 186.5 | 12.4 | 79.5 |
| (f) FILM THICKNESS (μm) OF NEGATIVE ELECTRODE IN DISCHARGED STATE | | 80.3 | 6.8 | 80.3 | 27.1 | 16.1 |
| (c + f) TOTAL FILM THICKNESS (μm) OF POSITIVE AND NEGATIVE ELECTRODES IN DISCHARGED STATE | | 192.6 | 119.1 | 108.5 | 139.9 | 53.7 |
| (a') MASS (g/m$^2$) OF POSITIVE ELECTRODE ACTIVE MATERIAL IN CHARGED STATE | | 281.8 | 281.8 | 23.9 | 23.9 | 23.9 |
| (b') MASS (g/m$^2$) OF POSITIVE ELECTRODE IN CHARGED STATE | | 334.5 | 334.5 | 27.7 | 27.7 | 48.0 |
| (c') FILM THICKNESS (μm) OF POSITIVE ELECTRODE IN CHARGED STATE | | 113.2 | 113.2 | 19.1 | 103.7 | 28.5 |
| (d') MASS (g/m$^2$) OF NEGATIVE ELECTRODE ACTIVE MATERIAL IN CHARGED STATE | | 117.9 | 21.5 | 117.9 | 21.5 | 21.5 |
| (e') MASS (g/m$^2$) OF NEGATIVE ELECTRODE IN CHARGED STATE | | 196.9 | 22.8 | 196.9 | 22.8 | 89.8 |
| (f') FILM THICKNESS (μm) OF NEGATIVE ELECTRODE IN CHARGED STATE | | 86.1 | 19.8 | 86.1 | 40.1 | 29.1 |
| (c' + f') TOTAL FILM THICKNESS (μm) OF POSITIVE AND NEGATIVE ELECTRODES IN CHARGED STATE | | 199.3 | 133.0 | 105.2 | 143.8 | 57.6 |
| VOLUME RATIO IN CHARGED AND DISCHARGED STATE | POSITIVE ELECTRODE (c/c') | 1.00 | 1.00 | 1.48 | 1.09 | 1.32 |
| | NEGATIVE ELECTRODE (f/f') | 1.07 | 2.91 | 1.07 | 1.48 | 1.81 |
| | TOTAL OF POSITIVE AND NEGATIVE ELECTRODES | 1.03 | 1.12 | 1.03 | 1.03 | 1.07 |

Examples 1 to 6 and Comparative Examples 4 and 5 relate to secondary batteries in which sulfur ($Li_2S$ in the discharged state, S in the charged state) is used as the positive electrode active material and silicon (Si in the discharged state, $Li_{15}Si_4$ in the charged state) is used as the negative electrode active material.

Comparative Example 1 relates to a secondary battery in which lithium cobalt oxide ($LiCoO_2$ in the discharged state, $Li_{0.5}CoO_2$ in the charged state) is used as the positive electrode active material and graphite (C in the discharged state, $LiC_6$ in the charged state) is used as the negative electrode active material.

Comparative Example 2 relates to a secondary battery in which lithium cobalt oxide ($LiCoO_2$ in the discharged state, $Li_{0.5}CoO_2$ in the charged state) is used as the positive electrode active material and silicon (Si in the discharged state, $Li_{15}Si_4$ in the charged state) is used as the negative electrode active material. Comparative Example 3 relates to a secondary battery in which sulfur ($Li_2S$ in the discharged state, S in the charged state) is used as the positive electrode active material and graphite (C in the discharged state, $LiC_6$ in the charged state) is used as the negative electrode active material.

In Examples 1 to 6 and Comparative Example 4, the porosities of the positive electrode and the negative electrode were changed from 10% to 80%. In Comparative Examples 1 to 3 and 5, the porosities of the positive electrode and the negative electrode are set to 20%.

In Examples 1 to 6 and Comparative Example 4, the positive electrode and the negative electrode are configured by only the three-dimensional current collector formed of the sponge-like structure of CNTs and the active material. In Comparative Examples 1 and 5, the positive electrode includes an Al foil current collector, and the negative electrode includes a Cu foil current collector. In Comparative Example 2, the positive electrode includes an Al foil current collector, and the negative electrode is configured by only the three-dimensional current collector formed of the sponge-like structure of CNTs and the active material. In Comparative Example 3, the negative electrode includes a Cu current collector, and the positive electrode is configured by only the three-dimensional current collector formed of the sponge-like structure of CNTs and the active material.

Here, the states in a discharged state and a charged state of the electrode structure in the secondary battery of Comparative Example 1 are schematically shown in FIGS. 5A and 5B. An electrode structure 200 includes a positive electrode 220 and a negative electrode 230 which are disposed with a separator 212 therebetween. The positive electrode 220 includes an Al foil current collector 222 and a positive electrode active material 224, and the negative electrode 230 includes a Cu foil current collector 232 and a negative electrode active material 234. The metal foil current collector (the Al foil current collector 222, the Cu foil current collector 232) limits the volume change of the electrode due to charging and discharging, and increases the mass of the secondary battery.

In an electrode structure 200A in the discharged state (FIG. 5A), a positive electrode 220A contains $LiCoO_2$ as the positive electrode active material 224A, and the negative electrode 230A contains C as the negative electrode active material 232A. In an electrode structure 200B in the charged state (FIG. 5B), the positive electrode 220B contains $Li_{0.5}CoO_2$ as the positive electrode active material 224B, and the negative electrode 230B contains $LiC_6$ as the negative electrode active material 234B.

In the secondary batteries of Examples 1 to 6 and Comparative Examples 1 to 5, the following calculation was performed on the assumption that the reference capacity of a positive and negative electrode pair per unit area is set to 40 $Ah/m^2$. Note that when the calculation is performed on the assumption of a battery in which positive and negative electrodes are repeatedly laminated, it is supposed that one half of one surface side of one positive electrode exchanges $Li^+$ ions with one negative electrode through a separator, and the other half of the other surface side of the same positive electrode exchanges $Li^+$ ions with another negative electrode through another separator. In this case, it is premised that the reference capacity of a half of the positive electrode or the negative electrode is set to 40 $Ah/m^2$.

The mass (a) of the positive electrode active material in a discharged state is the mass of the positive electrode per unit area in a discharged state. The mass (a) of the positive electrode active material in the discharged state is calculated by using the charge amount obtained from the above-mentioned reference capacity of the positive and negative electrode pair and the molecular weight of $Li_2S$ (45.95 g/mol). The mass (b) of the positive electrode in a discharged state is obtained by adding the mass (a) of the positive electrode active material in a discharged state with the masses per unit area of the three-dimensional current collector, a binder, and the metal foil current collector.

Examples 1 to 6 and Comparative Example 4 contain neither the binder nor the metal foil current collector. The mass (a) of the positive electrode active material in a discharged state calculated as described above is 34.3 $g/m^2$. When the mass ratio of the three-dimensional current collector to the positive electrode mass is set to 10% and the mass per unit area of the three-dimensional current collector is calculated, the calculation result is 3.8 $g/m^2$. The value of the positive electrode mass (b) in a discharged state is a value obtained by summing the above values, and is 38.1 $g/m^2$.

The calculation is performed for Comparative Examples 1 to 3 and 5 in the same way. However, the calculation is performed with the mass ratio of the binder to the positive electrode mass set to 5%, the mass ratio of the conductive material to the positive electrode mass set to 5%, and the thickness of the metal foil current collector (Al foil) of the positive electrode set to 7.5 μm. The thickness of 7.5 μm is used on the assumption that the Al foil of 15 μm in thickness is shared by the positive electrodes on both sides of the Al foil and the half thickness of the Al foil is used as the thickness of the positive electrode current collector for one positive electrode. A polymer compound (density of 1.0 $g/cm^3$) such as Poly Vinylidene DiFluoride (PVDF) is used as a binder.

The thickness (c) of the positive electrode in a discharged state is calculated as follows. From the above-calculated masses per unit area of the positive electrode active material, the three-dimensional current collector, and the binder and the densities of the respective materials thereof, the film thicknesses on the assumption that the respective materials are dense (hereinafter, "dense film thickness") are calculated. The total film thickness of the above film thicknesses and the film thickness of the metal foil current collector is determined. A pore layer thickness (a value assuming that pores are gathered) is calculated so that the porosity becomes a predetermined set value. The dense film thicknesses of the positive electrode active material, the three-dimensional current collector, and the binder, the film thickness of the metal foil current collector, and the pore layer thickness are summed up to calculate the positive electrode film thickness (c) in a discharged state.

For example, with respect to Example 1, the dense film thickness of the positive electrode active material is calculated to be 20.7 μm by using 34.3 $g/m^2$ of the mass (a) of the positive electrode active material in a discharged state and the density (1.66 $g/cm^3$) of $Li_2S$. The dense film thickness of the three-dimensional current collector is calculated to be 1.9 μm from 3.8 $g/m^2$ of the mass per unit area of the three-dimensional current collector and 2 $g/cm^3$ of the density of CNT. When a pore layer thickness which provides a porosity of 10% is calculated, the pore layer thickness is calculated to be 2.5 μm. When the dense film thickness of the positive electrode active material, the dense film thickness of the three-dimensional current collector, and the pore layer thickness are summed up, the positive electrode film thickness (c) in a discharged state is 25.1 μm.

The mass (d) of the negative electrode active material in a discharged state, the mass (e) of the negative electrode in a discharged state, and the film thickness (f) of the negative electrode in a discharged state are also calculated in the same way as the positive electrode. However, a value of 7.5 μm which was half the thickness of 15 μm of the Cu foil was used as the thickness of the metal foil current collector (Cu foil) of the negative electrode.

The total film thickness (c+f) of the positive and negative electrodes in a discharged state in Table 1 is the total film thickness of the positive electrode film thickness (c) in a discharged state and the negative electrode film thickness (f) in a discharged state.

With respect to "in a charged state", the calculation is also performed in the same way as "in a discharged state". However, since the masses per unit area and the dense film thicknesses of the three-dimensional current collector, the binder, the conductive material, and the metal foil current collector do not change from those in a discharged state, the same values as those in a discharged state are used. Furthermore, with respect to the pore layer thickness, in the case where the three-dimensional current collector formed of the sponge-like structure of CNTs is used, the volume flexibly changes even when the electrode expands/contracts, so that the pore layer thickness is maintained between "in a charged state" and "in a discharged state".

The volume ratio of the positive electrode and the negative electrode in the above Table 1 is a value obtained by dividing the film thickness under expansion by the film thickness under contraction. For the sulfur positive electrode, the volume ratio is a value obtained by dividing the film thickness in a discharged state by the film thickness in a charged state. With respect to the lithium cobalt oxide positive electrode, the volume ratio is a value obtained by dividing the film thickness in a charged state by the film thickness in a discharged state. With respect to the silicon negative electrode and the graphite negative electrode, the volume ratios are values obtained by dividing the film thickness in a charged state by the film thickness in a discharged state. The volume ratio for the total of the positive and negative electrodes is a value obtained by dividing a larger value by a smaller value with respect to the total thickness of the positive and negative electrodes in a discharged state and the total thickness of the positive and negative electrodes in a charged state.

The following Table 2 shows the configurations of the entire secondary batteries of the Examples and the Comparative Examples together with the gravimetric energy density and the volumetric energy density. The secondary batteries are configured so that such an electrode structure as shown in the above Table 1 is accommodated in a case together with an electrolytic solution.

as the positive electrode active material, the S mass per unit area (a") is zero. With respect to Examples 1 to 5 and Comparative Examples 2, 4 and 5 in which Si is used as the negative electrode active material, the mass (d) of the negative electrode active material in a discharged state described in the above Table 1 is used for the Si mass per unit area (d"). In Comparative Example 1 and Comparative Example 3, since Si is not used for the negative electrode active material, the Si mass per unit area (d") is zero.

From the ratios of the Li mass per unit area, the S mass per unit area, and the Si mass per unit area to the reference mass (h) of the positive and negative electrode pair, the mass ratio of Li, S, and Si in the secondary battery is determined. The reference mass (h) of the positive and negative electrode pair is calculated by adding the mass (b) of the positive electrode in a discharged state and the mass (e) of the negative electrode in a discharged state with the masses per unit area of the separator, the electrolytic solution, and the battery case.

The mass per unit area of the separator is set to 7.5 g/m$^2$ in common to the Examples and the Comparative Examples, and the mass per unit area of the electrolytic solution is 22.5 g/m$^2$ in common to the Examples and the Comparative Examples. The mass per unit area of the battery case is set so that the mass ratio of the case in the mass of the entire battery was 20%.

It is shown in the above Table 2 that in the secondary batteries of Examples 1 to 6, the Li mass ratio is 5.0 mass

TABLE 2

|  | EXAMPLES | | | | | | COMPARATIVE EXAMPLES | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| (g) Li MASS (g/m$^2$) | 10.4 | 10.4 | 10.4 | 10.4 | 10.4 | 10.4 | 20.7 | 20.7 | 10.4 | 10.4 | 10.4 |
| (a") S MASS (g/m$^2$) | 23.9 | 23.9 | 23.9 | 23.9 | 23.9 | 23.9 | 0 | 0 | 23.9 | 23.9 | 23.9 |
| (d") Si MASS (g/m$^2$) | 11.2 | 11.2 | 11.2 | 11.2 | 11.2 | 11.2 | 0 | 11.2 | 0 | 11.2 | 11.2 |
| (h) REFERENCE MASS (g/m$^2$) OF POSITIVE AND NEGATIVE ELECTRODE PAIR | 100.6 | 100.6 | 100.6 | 100.6 | 100.6 | 100.6 | 701.7 | 484.1 | 318.3 | 100.6 | 209.8 |
| (i) FILM THICKNESS (μm) OF POSITIVE AND NEGATIVE ELECTRODE PAIR IN DISCHARGED STATE | 48.5 | 52.6 | 57.9 | 64.9 | 74.7 | 89.4 | 218.5 | 141.1 | 130.0 | 163.0 | 72.3 |
| (j) FILM THICKNESS (μm) OF POSITIVE AND NEGATIVE ELECTRODE PAIR IN CHARGED STATE | 52.6 | 56.7 | 62.0 | 69.0 | 78.8 | 93.5 | 225.6 | 155.8 | 126.6 | 167.2 | 76.5 |
| (g/h) Li MASS RATIO (MASS %) | 10.3 | 10.3 | 10.3 | 10.3 | 10.3 | 10.3 | 3.0 | 4.3 | 3.3 | 10.3 | 5.0 |
| (a"/h) S MASS RATIO (MASS %) | 23.8 | 23.8 | 23.8 | 23.8 | 23.8 | 23.8 | 0.0 | 0.0 | 7.5 | 23.8 | 11.4 |
| (d"/h) Si MASS RATIO (MASS %) | 11.1 | 11.1 | 11.1 | 11.1 | 11.1 | 11.1 | 0.0 | 2.3 | 0.0 | 11.1 | 5.3 |
| (k) REFERENCE CAPACITY (Ah/m$^2$) OF POSITIVE AND NEGATIVE ELECTRODE PAIR | 40 | 40 | 40 | 40 | 40 | 40 | 40 | 40 | 40 | 40 | 40 |
| (l) ELECTROMOTIVE FORCE (V) | 2.0 | 2.0 | 2.0 | 2.0 | 2.0 | 2.0 | 3.6 | 3.6 | 2.0 | 2.0 | 2.0 |
| (m) REFERENCE CAPACITY (Wh/m$^2$) OF POSITIVE AND NEGATIVE ELECTRODE PAIR | 80 | 80 | 80 | 80 | 80 | 80 | 144 | 144 | 80 | 80 | 80 |
| (n) GRAVIMETRIC ENERGY DENSITY (Wh/kg) | 795 | 795 | 795 | 795 | 795 | 795 | 205 | 297 | 251 | 795 | 381 |
| (o) VOLUMETRIC ENERGY DENSITY (Wh/L) | 1520 | 1411 | 1290 | 1159 | 1015 | 856 | 638 | 924 | 615 | 478 | 1046 |

The Li mass (g) per unit area is calculated from a charge amount calculated from the reference capacity of the positive and negative electrode pair and the atomic weight of Li (6.941 g/mol). When the positive electrode active material was $Li_2S$, the calculation is performed on the assumption that the utilization of Li was 100%, and when the positive electrode active material was $LiCoO_2$, the calculation is performed on the assumption that the Li utilization was 50%. With respect to embodiments 1 to 5 and Comparative Examples 3 to 5 in which S is used as the positive electrode active material, the mass (a') of the positive electrode active material in a charged state described in the above Table 1 is used for the S mass per unit area (a"). In Comparative Example 1 and Comparative Example 2, since S is not used % or more, the S mass ratio is 12 mass % or more, and the Si mass ratio is 6 mass % or more.

The gravimetric energy density (n) is determined by multiplying the reference capacity (k) of the positive and negative electrode pair by an electromotive force (l) which is a value determined by the positive and negative electrode active materials and then dividing the thus-obtained value by the reference mass (h) of the positive and negative electrode pair described above.

The volumetric energy density (o) is determined by multiplying the reference capacity (k) of the positive and negative electrode pair by the electromotive force (l) which is the value determined by the positive and negative electrode active materials and then dividing the thus-obtained value by the value of larger one of the film thickness (i) of the positive and negative electrode pair in a discharged state and the film thickness (j) of the positive and negative electrode pair in a charged state. The film thickness (i) of the positive and negative electrode pair in a discharged state and the film thickness (j) of the positive and negative electrode pair in a charged state are determined by adding the film thickness of the separator and the film thickness of the battery case to the total film thickness of the positive and negative electrodes in discharged/charged state. The film thickness of the separator is set to 15 μm in common to the Examples and the Comparative Examples. The film thickness of the battery case is set such that the thickness ratio of the case in the entire thickness of the secondary battery was 5%.

Figure 6:
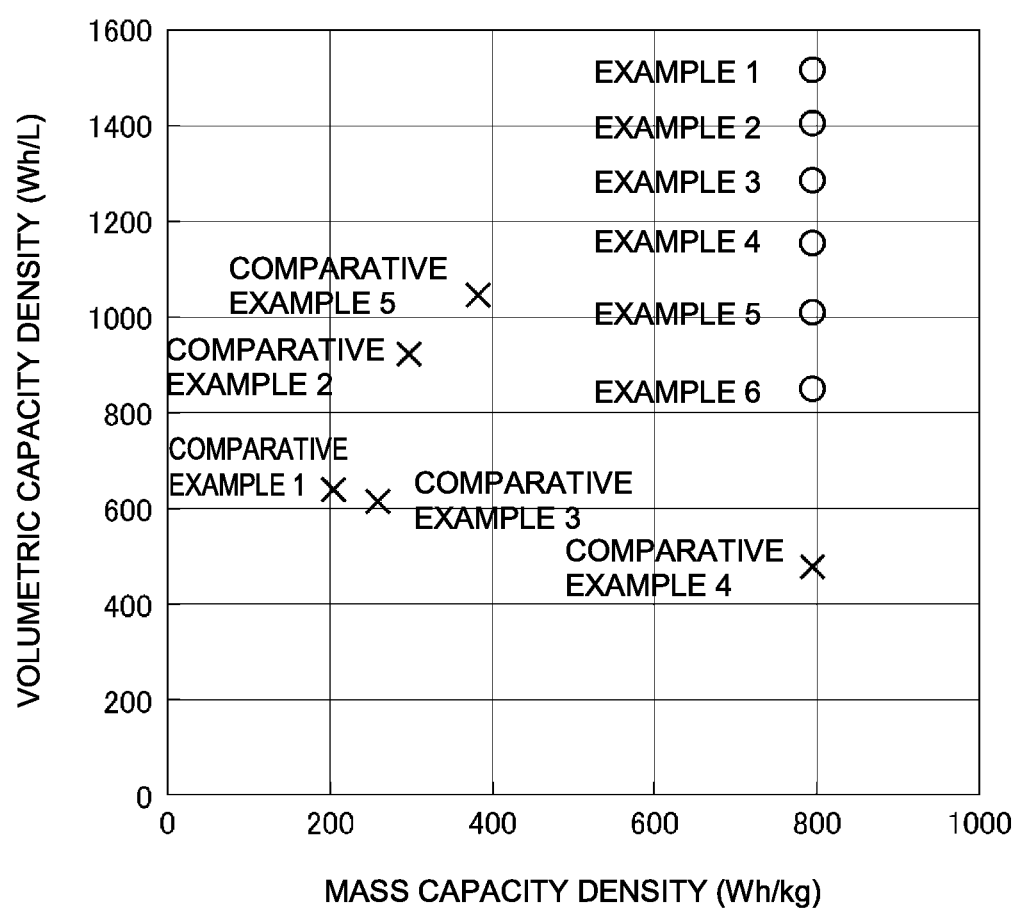
FIG. 6 is a graph plotting the volumetric energy density versus the gravimetric energy density of secondary batteries of Examples and Comparative Examples.

FIG. 6 shows a result obtained by plotting the gravimetric energy density (n) on the abscissa axis and the volumetric energy density (o) on the ordinate axis.

Referring to FIG. 6, it is apparent that the secondary batteries of Examples 1 to 6 have gravimetric energy densities of 400 Wh/kg or more and volumetric energy densities of 700 Wh/L or more. As the porosities of the positive and negative electrodes are smaller, higher volumetric energy density can be obtained.

As shown in the above Table 1, in Examples 1 to 6, the volume ratio of the positive electrode and the negative electrode in charged and discharged states is 1.1 or more, and the volume ratio of the negative electrode is 1.9 or more. Furthermore, the ratio of the total volumes of the positive electrode and the negative electrode in charged and discharged states is 1.2 or less. Examples 1 to 6 satisfy all the conditions that the volume ratio of the positive electrode and the negative electrode is 1.1 or more, the volume ratio of the positive electrode or the negative electrode is 1.9 or more, and the ratio of the total volumes of the positive electrode and the negative electrode in charged and discharged states is 1.2 or less.

In addition to satisfaction of the condition on the volume ratio as described above, the secondary batteries of the Examples are higher in Li mass ratio, S mass ratio and Si mass ratio than those of the Comparative Examples. The high capacity density of the secondary batteries of the Examples is based on these requirements.

In Comparative Examples 1 to 5, although the ratio of the total volumes of the positive electrode and the negative electrode in charged and discharged states is 1.2 or less, the volume ratio of each of the positive electrode and the negative electrode does not satisfy the above-mentioned condition. In Comparative Example 1, the positive electrode and the negative electrode have a volume ratio less than 1.1 in charged and discharged states. In Comparative Examples 2 and 4, the volume ratio of the positive electrode in charged and discharged states is less than 1.1, and in Comparative Example 3, the volume ratio of the negative electrode in charged and discharged states is less than 1.1. In Comparative Example 5, the volume ratio of the positive electrode and the negative electrode in charged and discharged states is less than 1.9.

Therefore, it is impossible for the secondary batteries of the Comparative Examples to have the gravimetric energy density of 400 Wh/kg or more and the volumetric energy density of 700 Wh/L or more. Furthermore, it is one of causes of making it impossible to increase the capacity density that the porosities of the positive and negative electrodes are 80% (Comparative Example 4), at least one of the positive electrode and the negative electrode contains metal foil (Comparative Examples 1 to 3 and 5), the Li mass ratio is less than 5 mass % (Comparative Examples 1 to 3), the S mass ratio is less than 12 mass % (Comparative Examples 1 to 3, 5), and Si mass ratio is less than 6 mass % (Comparative Examples 1 to 3, 5).

REFERENCE SIGNS LIST

10, 10A, 10B electrode structure
12 separator
20, 20A, 20B positive electrode
30, 30A, 30B negative electrode

What is claimed is:

1. A secondary battery comprising an electrode structure, the electrode structure comprising:
   a separator having one surface and an other surface;
   a positive electrode changing in volume by expansion during discharging and contraction during charging, the positive electrode being provided on the one surface of the separator; and
   a negative electrode changing in volume by contraction during discharging and expansion during charging, the negative electrode being provided on the other surface of the separator, wherein
   each of a volume ratio of the positive electrode and a volume ratio of the negative electrode is 1.1 or more, the volume ratio of the positive electrode being a value obtained by dividing a volume of the positive electrode under expansion by a volume of the positive electrode under contraction and the volume ratio of the negative electrode being a value obtained by dividing a volume of the negative electrode under expansion by a volume of the negative electrode under contraction,
   at least one of the volume ratio of the positive electrode and the volume ratio of the negative electrode is 1.9 or more, and
   a total volume ratio is 1.2 or less, the total volume ratio being a value obtained by dividing a larger value by a smaller value with respect to a total volume of a volume of the positive electrode and a volume of the negative electrode in a discharged state and a total volume of a volume of the positive electrode and a volume of the negative electrode in a charged state.

2. The secondary battery according to claim 1, wherein the positive electrode comprises a first three-dimensional current collector formed of a sponge-like structure of carbon nanotubes, and a positive electrode active material contained inside the first three-dimensional current collector, and the negative electrode comprises a second three-dimensional current collector formed of a sponge-like structure of carbon nanotubes, and a negative electrode active material contained inside the second three-dimensional current collector.

3. The secondary battery according to claim 1, wherein porosities of the positive electrode and the negative electrode are 5% or more and less than 80%.

4. The secondary battery according to claim 1, wherein the positive electrode and the negative electrode comprise no metal foil current collector.

5. The secondary battery according to claim 1, wherein the secondary battery is a lithium secondary battery, the positive electrode or the negative electrode comprises Li, and the Li has a mass of 5% or more of the secondary battery.

6. The secondary battery according to claim 5, wherein the positive electrode comprises S, and the S has a mass of 12% or more of the secondary battery.

7. The secondary battery according to claim 5, wherein the negative electrode comprises Si, and the Si has a mass of 6% or more of the secondary battery.

8. The secondary battery according to claim 1, wherein gravimetric energy density is 400 Wh/kg or more, and volumetric energy density is 700 Wh/L or more.

9. The secondary battery according to claim 1, wherein each area of the positive electrode and the negative electrode which is in contact with the separator does not substantially change during charging and discharging.

10. The secondary battery according to claim 4, wherein the positive electrode or the negative electrode comprises metal wire or metal grid.

11. The secondary battery according to claim 1, wherein the volume ratio of the positive electrode is 1.1 or more, and the volume ratio of the negative electrode is 1.9 or more.

* * * * *